United States Patent [19]

Van der Lely

[11] 3,747,941

[45] July 24, 1973

[54] TAPE RECORDING AND/OR PLAY-BACK APPARATUS

[76] Inventor: Piet Van der Lely, Emmasingel, Eindhoven, Netherlands

[22] Filed: Apr. 13, 1971

[21] Appl. No.: 133,588

[30] Foreign Application Priority Data

Apr. 29, 1970 Netherlands .................... 7006246

[52] U.S. Cl. .................................... 274/4 E

[51] Int. Cl. .................................... G11b 15/24

[58] Field of Search ................ 274/4 C, 4 E, 11 C; 242/198–201

[56] References Cited

UNITED STATES PATENTS

| | | | |
|---|---|---|---|
| 3,458,158 | 7/1969 | Ohira | 274/4 E |
| 3,475,031 | 10/1969 | Kuehnlein | 274/4 C |
| 3,445,116 | 5/1969 | Knox | 274/4 A |
| 3,628,754 | 12/1971 | Fujikawa | 274/4 E |

*Primary Examiner*—Harry N. Haroian
*Attorney*—Frank R. Trifari

[57] ABSTRACT

An apparatus for recording and/or playing back magnetic tape recordings from a cassette, is provided with a fixed mounting plate on which are arranged two winding spindles and a capstan. A movable mounting plate, on which are arranged at least one magnetic head and a pressure roller is also provided. The movable mounting plate is locked in a retracted position by a latch member. The latch is released when the cassette is placed on the first mounting plate. The movable plate is thus moved by a spring force into an operating position in which the magnetic heads and the pressure roller project into the cassette. Two ejection keys are provided which are positioned so that they may be operated by the thumb and a finger of one hand to return the movable plate from the operating position to the retracted position. The latch will thereby return to the latching position and simultaneously strike the cassette so that the latter springs from the fixed mounting plate into the palm of the operating hand.

4 Claims, 5 Drawing Figures

Figure 1:
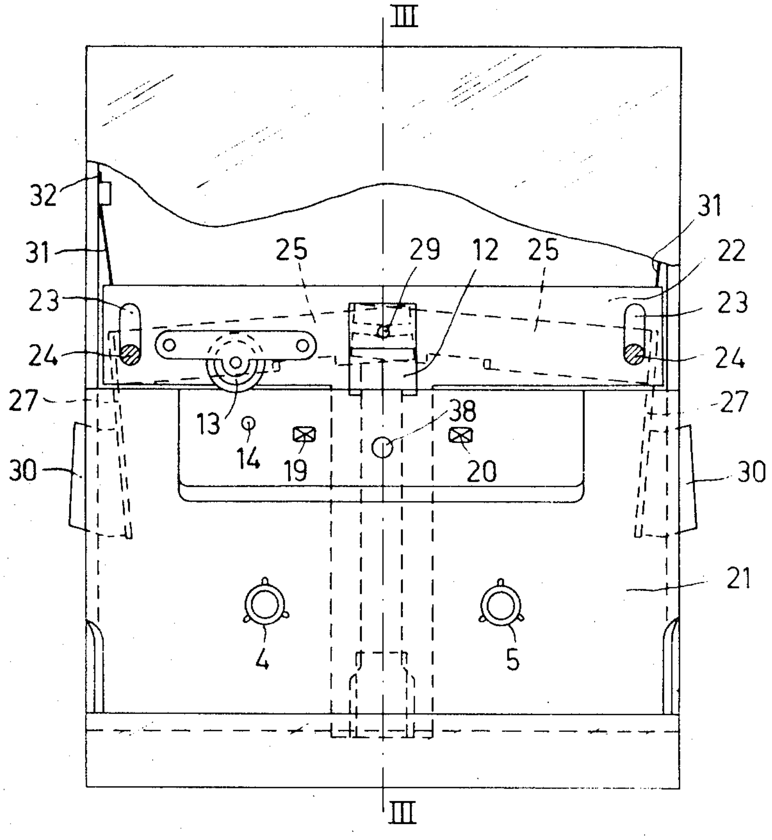

INVENTOR.
PIET VAN DER LELY
BY
AGENT

INVENTOR.
PIET VAN DER LELY
BY
AGENT

*INVENTOR.*

PIET VAN DER LELY

*BY* Frank R. Sciffani

AGENT

INVENTOR.

PIET VAN DER LELY

BY Frank R. Trifari

AGENT

TAPE RECORDING AND/OR PLAY-BACK APPARATUS

The invention relates to an apparatus for recording and/or playing back magnetic recordings on or from a tape-shaped record carrier. The tape is accommodated in a cassette which has apertures in one wall so that the cassette can be placed on two winding spindles and a capstan forming parts of the apparatus. In a side-wall of the cassette additional apertures are provided through which — in the operation condition of the apparatus — magnetic head means and a pressure roller forming parts of the apparatus project into the cassette. The apparatus has a first fixed mounting plate supporting the winding spindles and the capstan and a second mounting plate on which the magnetic head means and the pressure roller are mounted. The second plate displaceable under the influence of the spring force from a retracted position into the said operating position and back again to the retracted position. A latch member is provided which locks the displaceable mounting plate in the retracted position. An element which is operable when a cassette is placed on the spindles and the capstan, to release the latch member against a spring force. A manually operable resetting means enabling the displaceable mounting plate to be displaced from the operating position to the retracted position is also provided.

In a known apparatus of the type described a cassette holder is rotatably arranged on the fixed mounting plate which supports the winding spindles and the capstan. In a raised inclined position of this holder a cassette may be inserted into the holder, after which the holder containing the cassette is pivoted down onto the mounting plate so as to place the cassette on the spindles and the capstan. In this operation, the holder actuates the element for releasing the latch, which latch initially locks the displaceable mounting plate containing the magnetic head means and the pressure roller in the retracted position but on being unfastened releases this plate, so that under the influence of the spring force acting on it the plate moves to the operating position so as to bring the magnetic head means and the pressure roller into the cassette. By the manually operable setting means the displaceable plate may be moved back so that the magnetic head means and the pressure roller are removed from the cassette. During this returning movement the latch member will resiliently return to the locking position and simultaneously actuate the releasing element so that the latter springs back so as to tilt the cassette holder containing the cassette relative to the mounting plate, after which the cassette can be taken from the holder.

Although by the automatic insertion of the magnetic head means and the pressure roller into the cassette when it is placed on the spindles and the capstan the number of operations required in such cassette apparatus has been reduced in some degree, in the said known apparatus taking the cassette from the apparatus still requires two separate operations, i.e. operating the resetting means and removing the cassette from the holder.

It is an object of the present invention to provide a simplified apparatus in wich the number of operations for removing the cassette from the apparatus has been reduced to a minimum. According to the invention an apparatus of the type described at the beginning of the specification is characterized in that the releasing element is operated by the cassette itself when the latter is placed on the fixed mounting plate and in that the resetting means comprise at least one ejecton key which is disposed beside a bearing surface for the cassette constituted by the fixed mounting plate and is movable in a plane parallel to this plate.

The steps according to the invention provide the advantage that when the ejection key is operated by a thumb or finger under the influence of the releasing element springing back the cassette will automatically be thrown into the same hand and hence may be removed from the apparatus without any additional displacement of this hand and hence without an additional operation.

A preferred embodiment of the invention consists in the provision of two ejection keys which are movable in one plane beneath and parallel to the fixed mounting plate and project through side-walls which bound the cassette bearing surface and extend at right angles to a plane containing the two winding spindles.

In this embodiment, the two ejection keys may be pushed in by the thumb and a finger of one hand by a simple squeezing movement, so that the palm of the hand is above the cassette so that the latter automatically springs into the palm this hand.

According to the invention the or each key is preferably provided on one of the arms of a bell-crank lever which is pivotable about a pivot fixedly arranged in the apparatus, the other arm of the lever being coupled to the displaceable mounting plate by a pin-and-slot connection. This provides a simple and inexpensive design of the setting means to be operated by the keys.

According to the invention, the latch member which is releasable against spring force preferably is constituted by a leaf spring which is secured in the apparatus beneath the fixed mounting plate and has a free end which is bent so as to form a lug which locks the displaceable mounting plate in the retracted position, and the releasing element which is adapted to be operated when the cassette is placed on the fixed mounting plate consists of a pin which projects through this plate and bears against the leaf spring.

Figure 2:
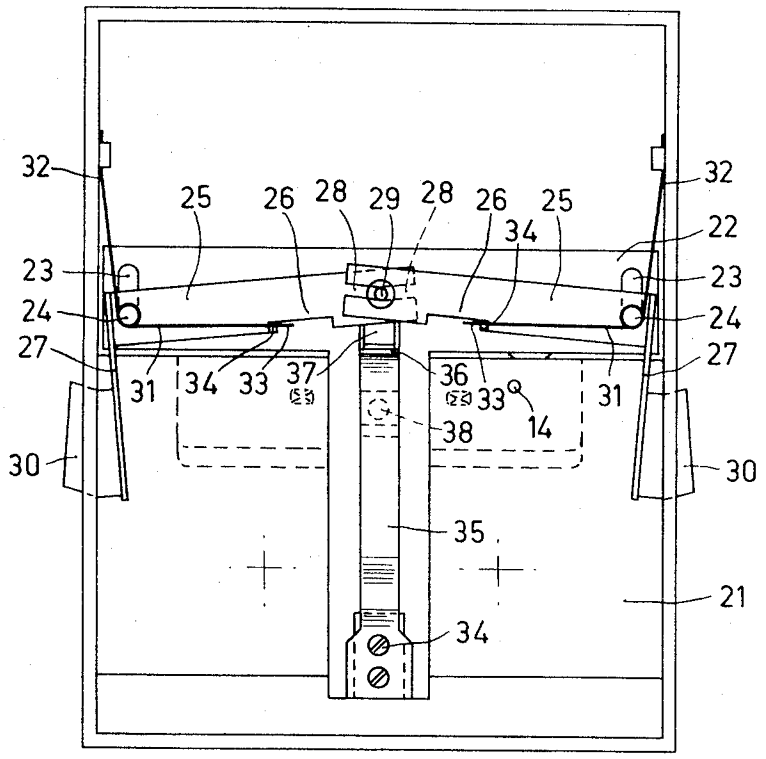
Figure 3:
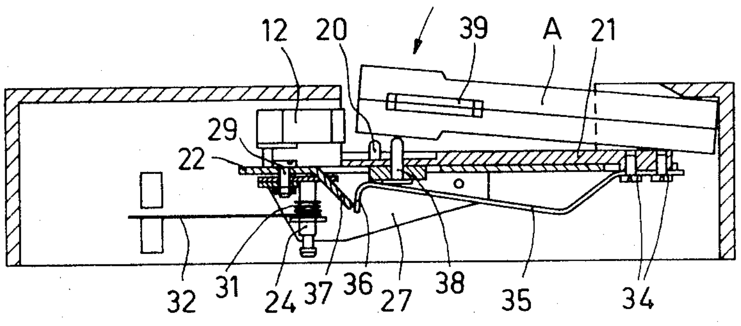
Figure 4:
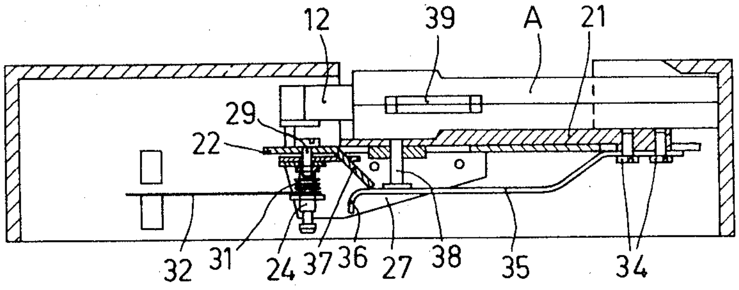
Figure 5:
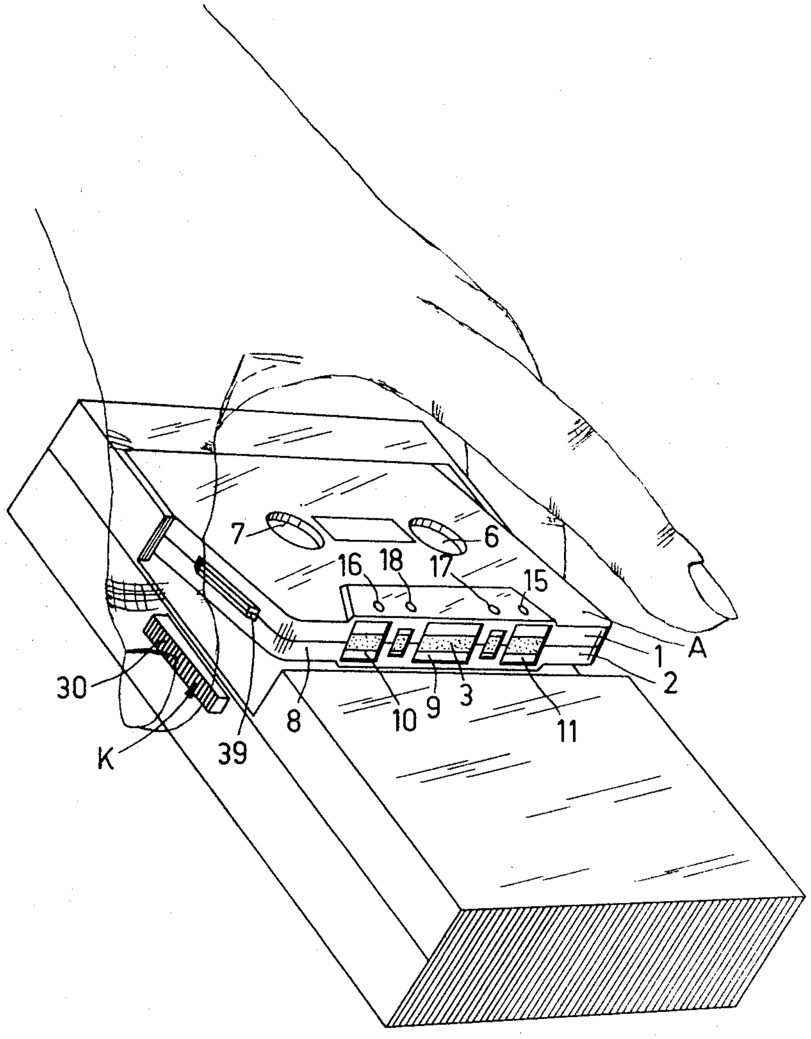

A preferred embodiment of the invention will now be described, by way of example, with reference to the accompanying diagrammatic drawings, in which:

FIG. 1 is a top plan view of an appratus according to the invention with the displaceable mounting plate in its retracted position, FIG. 2 is a bottom plan view of the apparatus shown in FIG. 1, FIG. 3 is a cross-sectional view taken on the line III—III of FIG. 1 and shows the condition of the apparatus at the instant at which a cassette is inserted, FIG. 4 is a cross-sectional view similar to that shown in FIG. 3, with the cassette inserted into the apparatus and the displaceable mounting plate in the operational position, and FIG. 5 is a perspective view showing the operation of removing a cassette from the apparatus.

An apparatus according to the invention is intended for recording and/or playing back magnetic recordings by means of a cassette A of the type shown in particular in FIG. 5. The cassette comprises two identical casing halves 1 and 2 which are secured together and accommodate two hubs, not shown, on and from which a tape-shaped record carrier 3 is wound. The hubs may be driven in known manner by winding spindles 4 and 5 (FIG. 1) which are provided in the apparatus and which when the cassette has been placed on the apparatus project into the cassette through apertures 6 and 7 so as to co-operate with the hubs. A lateral wall 8 of the cassette is provided with apertures 9, 10 and 11, behind which the tape 3 extends. The aperture 9 serves, for example, to enable a combined record play-back head 12 to contact the tape 3 through this aperture, whilst an erase head (not shown) and a tape pressure roller 13 may be inserted through the apertures 10 and 11 respectively. The pressure roller 13 is capable of co-operating with a capstan 14 which forms part of the apparatus and, according to the position of the cassette, projects through an aperture 15 or 16, so that during operation the tape 3 passes between the capstan 14 and the pressure roller 13. Apertures 17 and 18 are formed in the cassette to receive two centering pins 19 and 20 forming part of the apparatus.

The spindles 4 and 5 and the capstan 14 are rotatably mounted in a fixed mounting plate 21 of the apparatus and may be driven by known means, not shown. The centering pins 19 and 20 are also secured to the fixed mounting plate 21. The magnetic head 12, the possible erase head, not shown, and the pressure roller 13 are disposed on a T-shaped mounting plate 22 which is slidably guided in the apparatus. The plate 22 has two slots 23 formed in in into which project guide pins 24 forming part of the apparatus. From the inoperative retracted position shown in FIGS. 1, 2 and 3 the plate 22 may be moved, in a manner described more fully hereinafter, into an operative position shown in FIG. 4, and vice versa, in which operative position the magnetic head 12 and the pressure roller 13 project through the apertures 9 and 10 or 11 in a cassette placed on the fixed plate 21.

On each of the fixed pins 24 there is pivotably supported a bell-crank lever 25 bent from sheet material in a manner such that one arm 26 lies in a plane parallel to the plate 21 and the other arm 27 lies in a plane at right angles thereto. The ends of the arms 26 overlap and each have a slot 28 formed in them through which projects a pin 29 secured to the movable mounting plate 22. To the ends of the arms 27 there are secured keys 30 which protrude through opposed side-walls of the apparatus and, as will be described more fully hereinafter, serve as ejection keys for removing the cassette from the apparatus. Each pin 24 suppors a spring 31 wound from wire material, one end 32 of which bears against an inner wall of the apparatus and the other end 33 of which presses against a lug 34 bent from the arm 26 of the lever 25. The springs 31 exert a force on the levers 25, and, through the pin-and-slot connection established between the levers and the plate 22, on the displaceable plate 22, which force extends in the direction of the displacement of this plate from the retracted position to the operational position. In the retracted position of the plate 22, this displacement under the influence of the springs 31 is blocked in the following manner.

To the lower surface of the fixed mounting plate 21 there is mounted by means of bolts 34 of leaf-spring 35 the free end of which terminates in a downwardly bent lug 36. From the plane of the displaceable mounting plate 22 there has also been downwardly bent a lug 37, which is urged against the lug 36 of the leaf-spring 35 under the influence of the spring-force acting on the plate 22, the lug 36 serving as a latch member which prevents the plate 22 from moving the retracted position to the operating position. A pin 38 is supported in the fixed mounting plate 21 so as to be axially displaceable, one end of the pin projecting above the plate 21 and the other end bearing on the leaf-spring 35. When, as is shown in FIG. 3, a cassette A is placed on the fixed mounting plate of the apparatus, this cassette will depress the pin 38 against the force of the leaf spring 35, so that the lug 36 of the leaf-spring is also depressed.

At an instant which is determined by the shapes of the two co-operating lugs the lug 36 of the leaf-spring 35 will release the lug 37 of the movable plate 22, so that the movable plate is no longer locked and under the influence of the springs 31 will be moved, together with the magnetic head and the pressure roller, into the operating position, during which movement the lug 37 slides over the lug 36 and the leaf-spring is held in a tensioned condition. The resulting operating condition, in which magnetic recordings may be recorded and/or played back, is shown in FIG. 4. At the end of the movement of the plate 21 this plate peferably operates a switch, not shown, to start the apparatus.

During the displacement of the monting plate 22 from the retracted position shown in FIG. 3 to the operating position shown in FIG. 4 the levers 25 are pivoted about the pins 24 through comparatively small angles, with the result that the keys 30, compared with their positions shown in FIGS. 1 and 2, protrude further from the apparatus.

When the cassette is to be removed from the apparatus, it is sufficient to squeeze the keys 30 in the directions indicated by the arrow K with the thumb and a finger of one hand, after which the cassette will automatically spring into the palm of this hand, for which the keys 30 are depressed the levers 25 are pivoted back against the force of the springs 31 and hence the displaceable plate 22 is returned to its initial position. During this movement the lug 37 of the movable plate 22 will release the lug 36 of the leaf spring 35 and hence the leaf-spring itself, so that the latter will cause the pin 38, which initially was depressed by the cassette, to spring back and in its turn to cause the cassette to spring from the apparatus. As FIG. 5 further shows, the keys 30 are located beneath the standardized grapsing ridges normally provided on the type of cassette under consideration, so that the removal of the casette is additionally facilitated. When the keys 30 are subsequently released, the lug 37 of the movable plate 22 again abuts the lug 36 of the leaf-spring 35, and the initial position shown in FIG. 3 is re-established.

The above construction according to the invention ensures that the apparatus may be returned to an initial position and also the cassette may be removed from the apparatus by a single operation and without the user having to move his hand by which he operates the apparatus.

It should be noted that the invention is not restricted to the embodiment described and illustrated in the drawings. If it is desirable to reduce the friction between the two co-operating lugs 36 and 37 of the leaf-spring 35 and the movable plate 22, respectively, the lug 37 of the plate 22 may be replaced, for example, by a roller supported for free rotation in this plate. Further, the leaf-spring 35, which according to the invention extends in a direction parallel to the direction of movement of the movable plate 22, may extend at right angles to this direction if this should be desirable for constructional reasons.

What is claimed is:

1. An apparatus for recording and/or playing back recordings from a magnetic tape which is accommodated in a cassette, said cassette having openings in a first wall thereof for receiving winding spindles and a driving capstan of said apparatus, and additional openings in a side wall pependicular to said first wall for receiving magnetic head means and a pressure roller of said apparatus for engaging the tape within said cassette, said apparatus comprising a housing, a fixed mounting plate accommodated within said housing for supporting said cassette, a pair of winding spindles and driving capstan rotatably mounted on said fixed mounting plate for receiving said cassette and driving the tape therein, a movable mounting plate arranged within said housing for movement between a retracted position and an operating position, magnetic head means and a pressure roller mounted on said movable mounting plate so as to be displacable toward and away from the openings in the side wall of said cassette, said magnetic head means and pressure roller being inserted into said openings when said movable mounting plate is displaced to the operating position, spring means acting on said movable mounting plate for urging said plate into theoperating position, latching means movable between a latched and unlatched position for engaging said movable mounting plate when in the latched position to lock said movable mounting plate in its retracted position, spring means actng on said latching means for urging it into said latched position, a latch releasng member connected to said latching means and engageable by said cassette when said cassette is placed in the operating position on said fixed mounting plate to displace said latching means against the force of said spring means acting thereon so as to release said movable mounting plate allowing it to move to said operating position under the influence of the spring means acting thereon, and manually operable resetting means for returning said movable mounting plate to its retracted position comprising at least one ejection key disposed beside a bearing surface for the cassette formed by said fixed mounting plate movable in a plane parallel to this plate, and lever means connected at one end thereof to said key and acting at its other end on said movable mounting plate against the action of the spring means acting thereon so that when said key is depressed said movable mounting plate will be returned to said retracted position and said latching means will be urged into the latched position by said spring means acting thereon which also causes said latch release member to act against said cassette to disengage it from the fixed mounting plate.

2. The apparatus according to claim 1 wherein said resetting means comprises two ejection keys movable in a plane beneath and parallel to the fixed mounting plate and projecting through side walls of said housing which bound the cassette bearing surface and extend at right angles to the plane containing the two windings spindles.

3. The apparatus according to claim 1 wherein said lever means is a bell-crank lever pivotably mounted about a pivot fixedly arranged in the apparatus, said key being connected to one arm of said bell-crank lever, the other arm of the bell crank lever being coupled to the movable mounting plate through a pin-and-slot connection.

4. The apparatus according to claim 3 wherein said latching means which is releasable against a spring force comprises a leaf spring secured to the housing beneath the fixed mounting plate, a free end thereof being bent so as to form a lug which engages and locks said movable mounting plate when it is in the retracted position and wherein said latch releasing member comprises of a pin which projects through said fixed mounting plate and bears against said leaf spring.

* * * * *

PO-1050
(5/69)

UNITED STATES PATENT OFFICE
CERTIFICATE OF CORRECTION

Patent No. 3747941 Dated July 24, 1973

Inventor(s) PIET VAN DER LELY

It is certified that error appears in the above-identified patent and that said Letters Patent are hereby corrected as shown below:

IN THE HEADING:

After "[76] Inventor: " insert

--[73] Assignee: U.S. Philips Corp.,
New York, N.Y.--

Column 1, line 63, "wich" should read --which--

Column 3, line 27, "in in" should read --in it--

Column 3, line 47, "suppors" should read --supports--

Signed and sealed this 16th day of April 1974.

(SEAL)
Attest:

EDWARD M.FLETCHER,JR.
Attesting Officer

C. MARSHALL DANN
Commissioner of Patents